US006987493B2

(12) United States Patent
Chen

(10) Patent No.: US 6,987,493 B2
(45) Date of Patent: Jan. 17, 2006

(54) ELECTRONICALLY STEERABLE PASSIVE ARRAY ANTENNA

(75) Inventor: Shuguang Chen, Ellicott City, MD (US)

(73) Assignee: Paratek Microwave, Inc., Columbia, MD (US)

(*) Notice: Subject to any disclaimer, the term of this patent is extended or adjusted under 35 U.S.C. 154(b) by 16 days.

(21) Appl. No.: 10/413,317

(22) Filed: Apr. 14, 2003

(65) Prior Publication Data

US 2003/0193446 A1 Oct. 16, 2003

Related U.S. Application Data

(60) Provisional application No. 60/372,742, filed on Apr. 15, 2002.

(51) Int. Cl.
*H04B 7/00* (2006.01)

(52) U.S. Cl. ....................................... 343/893; 343/817

(58) Field of Classification Search ................. 343/893
See application file for complete search history.

(56) References Cited

U.S. PATENT DOCUMENTS

| | | | | |
|---|---|---|---|---|
| 3,560,978 | A | 2/1971 | Himmel et al. | |
| 4,290,071 | A | 9/1981 | Fenwick | |
| 5,312,790 | A | 5/1994 | Sengupta et al. | 501/137 |
| 5,427,988 | A | 6/1995 | Sengupta et al. | 501/137 |
| 5,486,491 | A | 1/1996 | Sengupta et al. | 501/137 |
| 5,593,495 | A | 1/1997 | Masuda et al. | 117/4 |
| 5,635,433 | A | 6/1997 | Sengupta | 501/137 |
| 5,635,434 | A | 6/1997 | Sengupta | 501/138 |
| 5,640,042 | A | 6/1997 | Koscica et al. | 257/595 |
| 5,693,429 | A | 12/1997 | Sengupt et al. | 428/699 |
| 5,694,134 | A | 12/1997 | Barnes | 343/700 |
| 5,766,697 | A | 6/1998 | Sengupta et al. | 427/585 |
| 5,767,807 | A | 6/1998 | Pritchett | |
| 5,830,591 | A | 11/1998 | Sengupta et al. | 428/701 |
| 5,846,893 | A | 12/1998 | Sengupta et al. | 501/137 |
| 5,886,867 | A | 3/1999 | Chivukula et al. | 361/311 |
| 5,990,766 | A | 11/1999 | Zhang et al. | 333/205 |

(Continued)

FOREIGN PATENT DOCUMENTS

EP 1 030 401 A 8/2000

(Continued)

OTHER PUBLICATIONS

U.S. Appl. No. 09/620,776, filed Jul. 21, 2000, Sengupta et al.

(Continued)

*Primary Examiner*—James Vannucci
(74) *Attorney, Agent, or Firm*—William J. Tucker; Donald D. Mondul; James S. Finn

(57) ABSTRACT

An electronically steerable passive array antenna and method for using the array antenna to steer the radiation beams and nulls of a radio signal are described herein. The array antenna includes a radiating antenna element capable of transmitting and receiving radio signals and one or more parasitic antenna elements that are incapable of transmitting or receiving radio signals. Each parasitic antenna element is located on a circumference of a predetermined circle around the radiating antenna element. A voltage-tunable capacitor is connected to each parasitic antenna element. A controller is used to apply a predetermined DC voltage to each one of the voltage-tunable capacitors in order to change the capacitance of each voltage-tunable capacitor and thus enable one to control the directions of the maximum radiation beams and the minimum radiation beams (nulls) of a radio signal emitted from the array antenna.

27 Claims, 5 Drawing Sheets

U.S. PATENT DOCUMENTS

| | | | | |
|---|---|---|---|---|
| 6,074,971 | A | 6/2000 | Chiu et al. | 501/139 |
| 6,377,142 | B1 | 4/2002 | Chiu et al. | 333/238 |
| 6,377,217 | B1 | 4/2002 | Zhu et al. | 343/700 |
| 6,377,440 | B1 | 4/2002 | Zhu et al. | 361/311 |
| 6,404,614 | B1 | 6/2002 | Zhu et al. | 361/277 |
| 6,407,719 | B1 * | 6/2002 | Ohira et al. | 343/893 |
| 6,492,883 | B2 | 12/2002 | Liang et al. | 333/132 |
| 6,514,895 | B1 | 2/2003 | Chiu et al. | 501/137 |
| 6,525,630 | B1 | 2/2003 | Zhu et al. | 333/205 |
| 6,531,936 | B1 | 3/2003 | Chiu et al. | 333/164 |
| 6,535,076 | B2 | 3/2003 | Partridge et al. | 333/17.1 |
| 6,538,603 | B1 | 3/2003 | Chen et al. | 342/372 |
| 6,597,668 | B1 * | 7/2003 | Schafer et al. | 370/280 |
| 6,600,456 | B2 * | 7/2003 | Richeson et al. | 343/834 |
| 6,683,513 | B2 * | 1/2004 | Shamsaifar et al. | 333/135 |

FOREIGN PATENT DOCUMENTS

| | | | |
|---|---|---|---|
| EP | 1 030 401 | A1 | 8/2000 |
| EP | 1 043 741 | A | 10/2000 |
| EP | 1 043 741 | A2 | 10/2000 |
| EP | 1 113 523 | A | 7/2001 |
| EP | 1 113 523 | A1 | 7/2001 |

OTHER PUBLICATIONS

T. Ohira et al. “Hand-Held Microwave Direction-of-Arrival Finder Based on Varactor-Tuned Analog Aerial Beamforming” IEEE Proceedings of APMC2001, Taipei, Taiwan, R.O.C., pp. 585-588, 2001.

T. Ohira et al. “Electronically Steerable Passive Array Radiator Antennas for Low-Cost Analog Adaptive Beamforning” IEEE Proceedings of APMC2000, Taipei, Taiwan, R.O.C., pp. 101-104, 2000.

J. Lu et al. “A Performance Comparison of Smart Antenna Technology for Wireless Mobile Computing Terminals” IEEE Proceedings of APMC2001, Taipei, Taiwan, R.O.C., pp. 581-584, 2001.

European Search Report,; Applic No. 03252376.3; Sep. 9, 2004.

Harrington, Roger F.; “Reactively Controlled Directive Arrays”; IEEE Transactions on Antennas and Propagation, vol. AP-26, No. 3, May 19, 1978.

Harrington R F: Reac, filed May 1978, IEEE.

* cited by examiner

ELECTRONICALLY STEERABLE PASSIVE ARRAY ANTENNA

CLAIMING BENEFIT OF PRIOR FILED PROVISIONAL APPLICATION

This application claims the benefit of U.S. Provisional Application Ser. No. 60/372,742 filed on Apr. 15, 2002 and entitled "Electronically Steerable Passive Array antenna with 360 Degree Beam and Null Steering Capability" which is incorporated by reference herein.

BACKGROUND OF THE INVENTION

1. Field of the Invention

This invention relates to an array antenna, and more particularly to an electronically 360 degree steerable passive array antenna capable of steering the radiation beams and nulls of a radio signal.

2. Description of Related Art

An antenna is used wherever there is wireless communication. The antenna is the last device through which a radio signal leaves a transceiver and the first device to receive a radio signal at a transceiver. Most antennas are designed to radiate energy into a "sector" which can be regarded as a "waste" of power since most of the energy is radiated in directions other than towards the intended transceiver. In addition, other transceivers experience the energy radiated in other directions as interference. As, such a great detail of effort has been made to design an antenna that can maximize the radiated energy towards the intended transceiver and minimize the radiation of energy elsewhere.

A scanning beam antenna is one type of antenna known in the art that can change its beam direction, usually for the purpose of maintaining a radio link between a tower and a mobile terminal. Early scanning beam antennas were mechanically controlled. The mechanical control of scanning beam antennas have a number of disadvantages including a limited beam scanning speed as well as a limited lifetime, reliability and maintainability of the mechanical components such as motors and gears. Thus, electronically controlled scanning beam antennas were developed and are becoming more important in the industry as the need for higher speed data, voice and video communications increases in wireless communication systems.

Referring to FIG. 1, there is illustrated a traditional electronically controlled scanning beam antenna 100 known in the art as a phased array antenna 100. The phased array antenna 100 has an RF signal input 102 connected to a network of power dividers 104. The power dividers 104 are connected to a series of phase shifters 106 (eight shown). The phase shifters 106 are used to control the phase of a radio signal delivered to an array of radiating elements 108 (eight shown). The phased array antenna 100 produces a radiation beam 110 that can be scanned in the direction indicated by arrow 112. As can be seen, the phased array antenna 100 has a complex configuration and as such is costly to manufacture. These drawbacks become even more apparent when the number of radiating elements 108 become larger.

Referring to FIG. 2, there is illustrated another traditional electronically controlled scanning beam antenna 200 that was described in U.S. Pat. No. 6,407,719 the contents of which are hereby incorporated by reference herein. The array antenna 200 includes a radiating element 202 capable of transmitting and receiving radio signals and one or more parasitic elements 204 that are incapable of transmitting or receiving radio signals. Each parasitic element 204 (six shown) is located on a circumference of a predetermined circle around the radiating element 202. Each parasitic element 204 is connected to a variable-reactance element 206 (six shown). A controller 208 changes the directivity of the array antenna 200 by changing the reactance $X_n$ of each of the variable-reactance elements 206. In the preferred embodiment, the variable-reactance element 206 is a varactor diode and the controller 208 changes the backward bias voltage Vb applied to the varactor diode 206 in order to change the capacitance of the varactor diode 206 and thus change the directivity of the array antenna 200. This array antenna 200 which incorporates varactor diodes 206 has several drawbacks when it operates as a high frequency transmit antenna. These drawbacks include low RF power handling, high linearity distortion and high loss of the RF energy. Accordingly, there is a need to address the aforementioned shortcomings and other shortcomings associated with the traditional electronically controlled scanning beam antennas. These needs and other needs are satisfied by the electronically steerable passive array antenna and method of the present invention.

BRIEF DESCRIPTION OF THE INVENTION

The present invention is an electronically steerable passive array antenna and method for using the array antenna to steer the radiation beams and nulls of a radio signal. The array antenna includes a radiating antenna element capable of transmitting and receiving radio signals and one or more parasitic antenna elements that are incapable of transmitting or receiving radio signals. Each parasitic antenna element is located on a circumference of a predetermined circle around the radiating antenna element. A voltage-tunable capacitor is connected to each parasitic antenna element. A controller is used to apply a predetermined DC voltage to each one of the voltage-tunable capacitors in order to change the capacitance of each voltage-tunable capacitor and thus enable one to control the directions of the maximum radiation beams and the minimum radiation beams (nulls) of a radio signal emitted from the array antenna.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
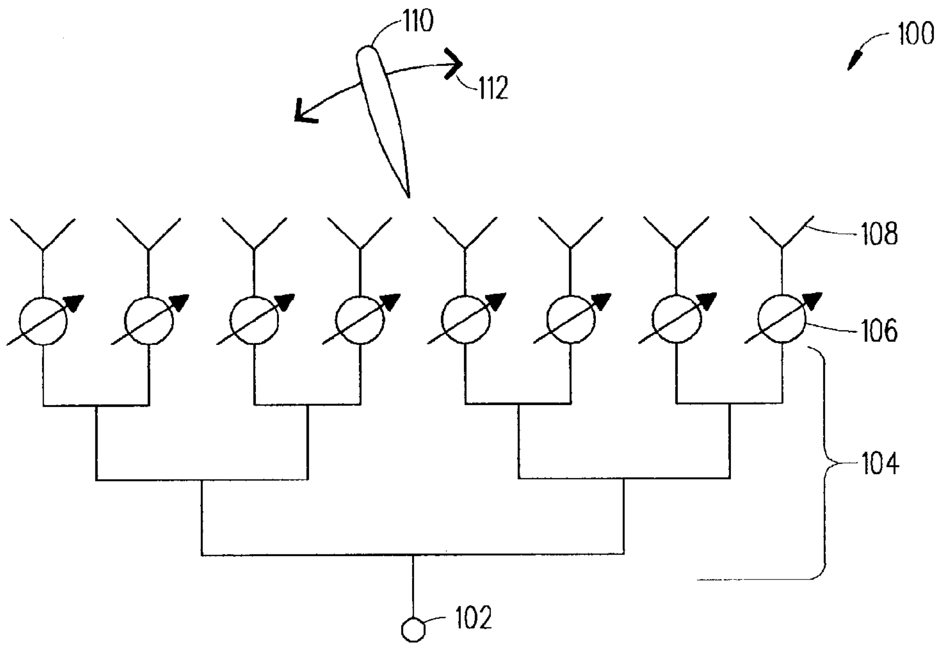
FIG. 1 (PRIOR ART)
FIG. 1 (PRIOR ART) is a diagram that illustrates the basic components of a traditional electronically controlled scanning beam antenna.
Figure 2:
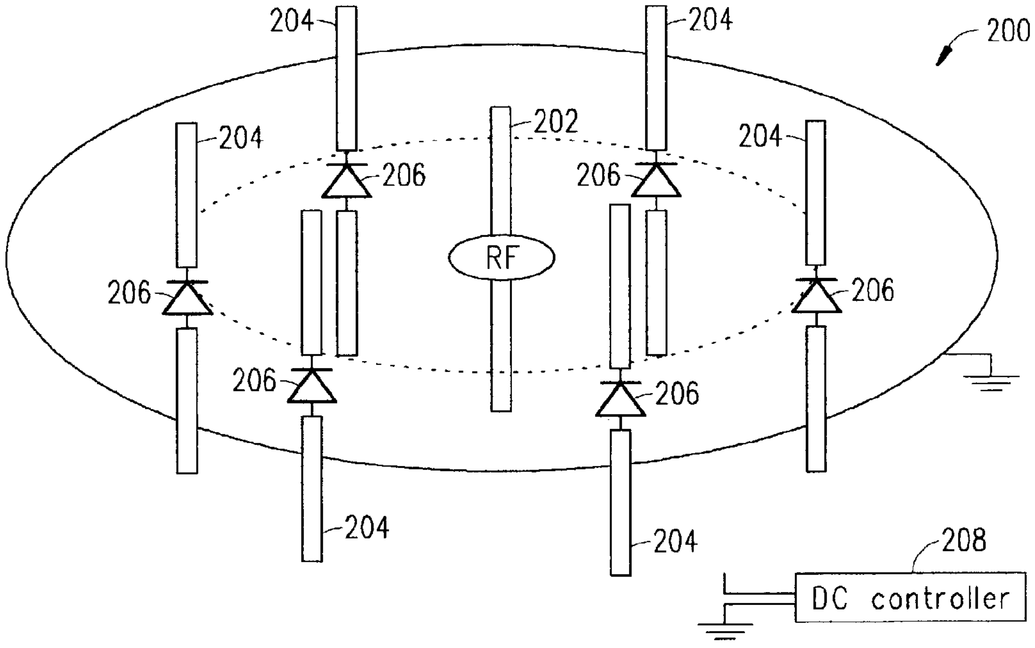
FIG. 2 (PRIOR ART)
FIG. 2 (PRIOR ART) is a perspective view that illustrates the basic components of another traditional electronically controlled scanning beam antenna.
Figure 3:
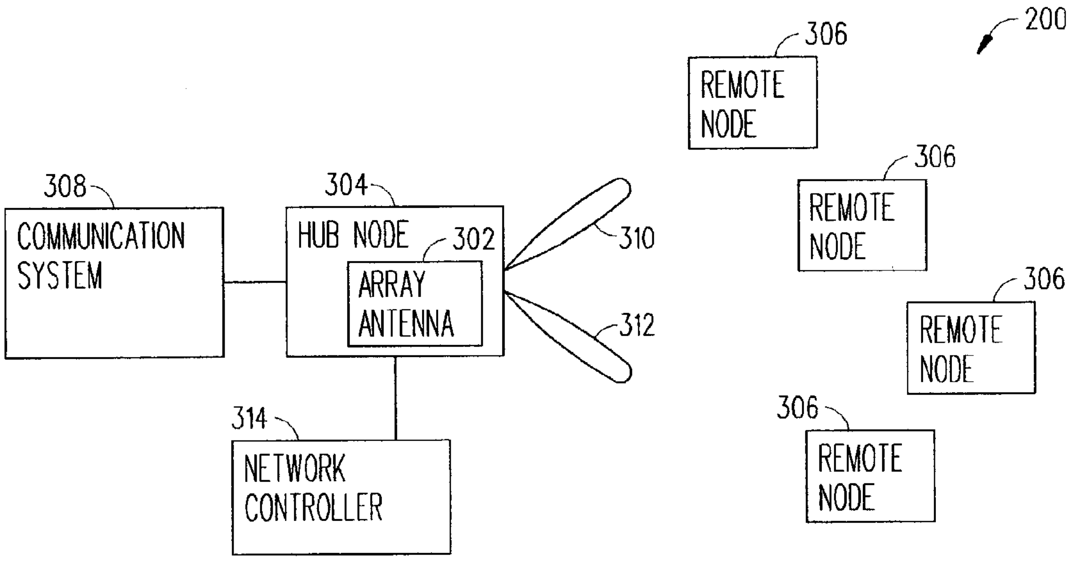
FIG. 3 is a block diagram of a wireless communications network capable of incorporating an array antenna of the present invention.

Referring to the drawings, FIG. 3 is a block diagram of a wireless communications network 300 that can incorporate an array antenna 302 in accordance with the present invention. Although the array antenna 302 is described below as being incorporated within a hub type wireless communication network 300, it should be understood that many other types of networks can incorporate the array antenna 302. For instance, the array antenna 302 can be incorporated within a mesh type wireless communication network, a 24–42 GHz point-to-point microwave network, 24–42 GHz point-to-multipoint microwave network or a 2.1–2.7 GHz multipoint distribution system. Accordingly, the array antenna 302 of the present invention should not be construed in a limited manner.

Referring to FIG. 3, there is a block diagram of a hub type wireless communications network 300 that utilizes the array antenna 302 of the present invention. The hub type wireless communications network 300 includes a hub node 304 and one or more remote nodes 306 (four shown). The remote nodes 306 may represent any one of a variety of devices. One example is for fixed site users, e.g. in a building, where the remote node 306 (e.g., customer premises equipment, laptop computer) is used to enable a wireless broadband connection to the hub node 304 (e.g., base station). Another example is for mobile site users, where the remote note 306 (wireless phone, personal digital assistant, laptop computer) is used to enable a wireless broadband connection to the hub node 304 (e.g., base station).

The hub node 304 incorporates the electronically steerable passive array antenna 302 that produces one or more steerable radiation beams 310 and 312 which are used to establish communications links with particular remote nodes 306. A network controller 314 directs the hub node 304 and in particular the array antenna 302 to establish a communications link with a desired remote node 306 by outputting a steerable beam having a maximum radiation beam pointed in the direction of the desired remote node 306 and a minimum radiation beam (null) pointed away from that remote node 306. The network controller 314 may obtain its adaptive beam steering commands from a variety of sources like the combined use of an initial calibration algorithm and a wide beam which is used to detect new remote nodes 306 and moving remote nodes 306. The wide beam enables all new or moved remote nodes 308 to be updated in its algorithm. The algorithm then can determine the positions of the remote nodes 308 and calculate the appropriate DC voltage for each of the voltage-tunable capacitors 406 (described below) in the array antenna 302. A more detailed discussion about one way the network controller 314 can keep up-to-date with its current communication links is provided in a co-owned U.S. patent application Ser. No. 09/620,776 entitled "Dynamically Reconfigurable Wireless Networks (DRWiN) and Methods for Operating such Networks". The contents of this patent application are incorporated by reference herein.

It should be appreciated that the hub node 304 can also be connected to a backbone communications system 308 (e.g., Internet, private networks, public switched telephone network, wide area network). It should also be appreciated that the remote nodes 308 can incorporate an electronically steerable passive array antenna 302.

Figure 4:
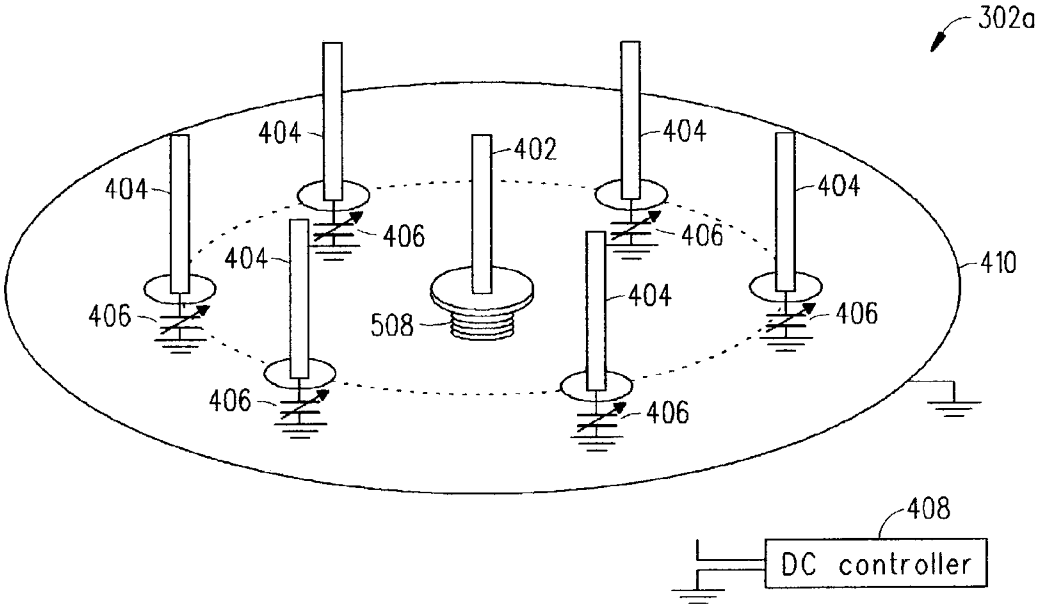
FIG. 4 is a perspective view that illustrates the basic components of a first embodiment of the array antenna shown in FIG. 3.

Referring to FIG. 4, there is a perspective view that illustrates the basic components of a first embodiment of the array antenna 302*a*. The array antenna 302*a* includes a radiating antenna element 402 capable of transmitting and receiving radio signals and one or more parasitic antenna elements 404 that are incapable of transmitting or receiving radio signals. Each parasitic antenna element 404 (six shown) is located a predetermined distance away from the radiating antenna element 402. A voltage-tunable capacitor 406 (six shown) is connected to each parasitic antenna element 404. A controller 408 is used to apply a predetermined DC voltage to each one of the voltage-tunable capacitors 406 in order to change the capacitance of each voltage-tunable capacitor 406 and thus enable one to control the directions of the maximum radiation beams and the minimum radiation beams (nulls) of a radio signal emitted from the array antenna 302. The controller 408 may be part of or interface with the network controller 314 (see FIG. 3).

In the particular embodiment shown in FIG. 4, the array antenna 302*a* includes one radiating antenna element 402 and six parasitic antenna elements 404 all of which are configured as monopole elements. The antenna elements 402 and 404 are electrically insulated from a grounding plate 410. The grounding plate 410 has an area large enough to accommodate all of the antenna elements 402 and 404. In the preferred embodiment, each parasitic antenna element 404 is arranged on a circumference of a predetermined circle around the radiating antenna element 402. For example, the radiating antenna element 402 and the parasitic antenna elements 404 can be separated from one another by about $0.2\lambda_0$–$0.5\lambda_0$ where $\lambda_0$ is the working free space wavelength of the radio signal.

Figure 5:
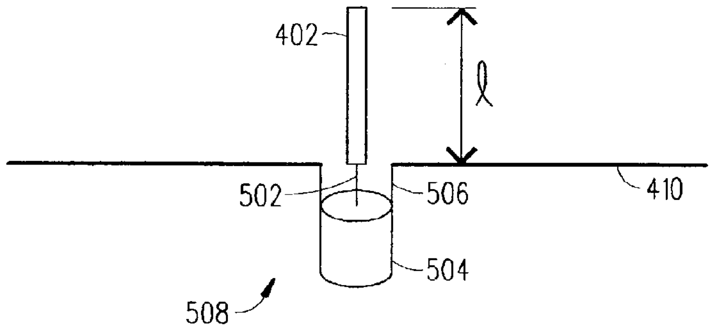
FIG. 5 is a side view of a RF feed antenna element located in the array antenna shown in FIG. 4.

Referring to FIG. 5, there is a side view of the RF feed antenna element 402. In this embodiment, the feeding antenna element 402 comprises a cylindrical element that is electrically insulated from the grounding plate 410. The feeding antenna element 402 typically has a length of $0.2\lambda_0$–$0.3\lambda_0$ where $\lambda_0$ is the working free space wavelength of the radio signal. As shown, a central conductor 502 of a coaxial cable 504 that transmits a radio signal fed from a radio apparatus (not shown) is connected to one end of the radiating antenna element 402. And, an outer conductor 506 of the coaxial cable 504 is connected to the grounding plate 410. The elements 502, 504 and 506 collectively are referred to as an RF input 508 (see FIG. 4). Thus, the radio apparatus (not shown) feeds a radio signal to the feeding antenna element 402 through the coaxial cable 504, and then, the radio signal is radiated by the feeding antenna element 402.

Figure 6:
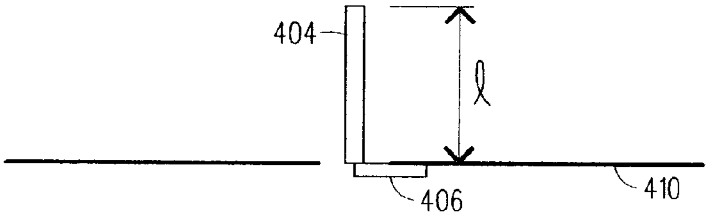
FIG. 6 is a side view of a parasitic antenna element and a voltage-tunable capacitor located in the array antenna shown in FIG. 4.

Referring to FIG. 6, there is a side view of one parasitic antenna element 404 and one voltage-tunable capacitor 406. In this embodiment, each parasitic antenna element 404 has a similar structure comprising a cylindrical element that is electrically insulated from the grounding plate 410. The parasitic antenna elements 404 typically have the same length as the radiating antenna element 402. The voltage-tunable capacitor 406 is supplied a DC voltage as shown in FIG. 4 which causes a change in the capacitance of the voltage-tunable capacitor 406 and thus enables one to the control of the directions of the maximum radiation beams and the minimum radiation beams (nulls) of a radio signal emitted from the array antenna 302. A more detailed discussion about the components and advantages of the voltage-tunable capacitor 406 are provided below with respect to FIGS. 7A and 7B.

Figure 7A:
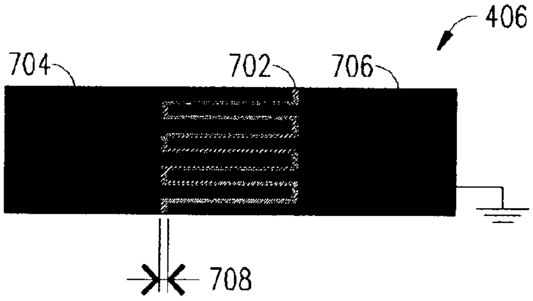
FIGS. 7A and 7B respectively show a top view and a cross-sectional side view of the voltage-tunable capacitor shown in FIG. 6.
Figure 7B:
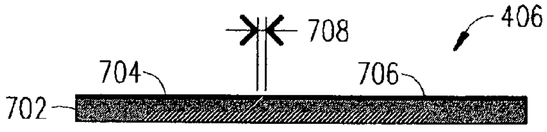

Referring to FIGS. 7A and 7B, there are respectively shown a top view and a cross-sectional side view of an exemplary voltage-tunable capacitor 406. The voltage-tunable capacitor 406 includes a tunable ferroelectric layer 702 and a pair of metal electrodes 704 and 706 positioned on top of the ferroelectric layer 702. As shown in FIG. 6, one metal electrode 704 is attached to one end of the parasitic antenna element 404. And, the other metal electrode 704 is attached to the grounding plate 410. The controller 408 applies the DC voltage to both of the metal electrodes 704 and 706 (see FIG. 4). A substrate (not shown) may be positioned on the bottom of the ferroelectric layer 702. The substrate may be any type of material that has a relatively low permittivity (e.g., less than about 30) such as MgO, Alumina, $LaAlO_3$, Sapphire, or ceramic.

The tunable ferroelectric layer 702 is a material that has a permittivity in a range from about 20 to about 2000, and has a tunability in the range from about 10% to about 80% at a bias voltage of about 10 V/$\mu$m. In the preferred embodiment this layer is preferably comprised of Barium-Strontium Titanate, $Ba_xSr_{1-x}TiO_3$ (BSTO), where x can range from zero to one, or BSTO-composite ceramics. Examples of such BSTO composites include, but are not limited to: BST—MgO, BSTO—$MgAl_2O_4$, BSTO—$CaTiO_3$, BSTO—$MgTiO_3$, BSTO—$MgSrZrTiO_6$, and combinations thereof. The tunable ferroelectric layer 702 in one preferred embodiment has a dielectric permittivity greater than 100 when subjected to typical DC bias voltages, for example, voltages ranging from about 5 volts to about 300 volts. And, the thickness of the ferroelectric layer can range from about 0.1 $\mu$m to about 20 $\mu$m. Following is a list of some of the patents which discuss different aspects and capabilities of the tunable ferroelectric layer 702 all of which are incorporated herein by reference: U.S. Pat. Nos. 5,312,790; 5,427,988; 5,486,491; 5,635,434; 5,830,591; 5,846,893; 5,766,697; 5,693,429 and 5,635,433.

The voltage-tunable capacitor 406 has a gap 708 formed between the electrodes 704 and 706. The width of the gap 708 is optimized to increase ratio of the maximum capacitance $C_{max}$ to the minimum capacitance $C_{min}$ ($C_{max}/C_{min}$) and to increase the quality factor (Q) of the device. The width of the gap 708 has a strong influence on the $C_{max}/C_{min}$ parameters of the voltage-tunable capacitor 406. The optimal width, g, is typically the width at which the voltage-tunable capacitor 406 has a maximum $C_{max}/C_{min}$ and minimal loss tangent. In some applications, the voltage-tunable capacitor 406 may have a gap 708 in the range of 5–50 $\mu$m.

The thickness of the tunable ferroelectric layer 702 also has a strong influence on the $C_{max}/C_{min}$ parameters of the voltage-tunable capacitor 406. The desired thickness of the ferroelectric layer 702 is typically the thickness at which the voltage-tunable capacitor 406 has a maximum $C_{max}/C_{min}$ and minimal loss tangent. For example, an antenna array 302*a* operating at frequencies ranging from about 1.0 GHz to about 10 GHz, the loss tangent would range from about 0.0001 to about 0.001. For an antenna array 302*a* operating at frequencies ranging from about 10 GHz to about 20 GHz, the loss tangent would range from about 0.001 to about 0.01. And, for an antenna array 302*a* operating frequencies ranging from about 20 GHz to about 30 GHz, the loss tangent would range from about 0.005 to about 0.02.

The length of the gap 708 is another dimension that strongly influences the design and functionality of the voltage-tunable capacitor 406. In other words, variations in the length of the gap 708 have a strong effect on the capacitance of the voltage-tunable capacitor 406. For a desired capacitance, the length can be determined experimentally, or through computer simulation.

The electrodes 704 and 706 may be fabricated in any geometry or shape containing a gap 708 of predetermined width and length. In the preferred embodiment, the electrode material is gold which is resistant to corrosion. However, other conductors such as copper, silver or aluminum, may also be used. Copper provides high conductivity, and would typically be coated with gold for bonding or nickel for soldering.

Figure 8A:
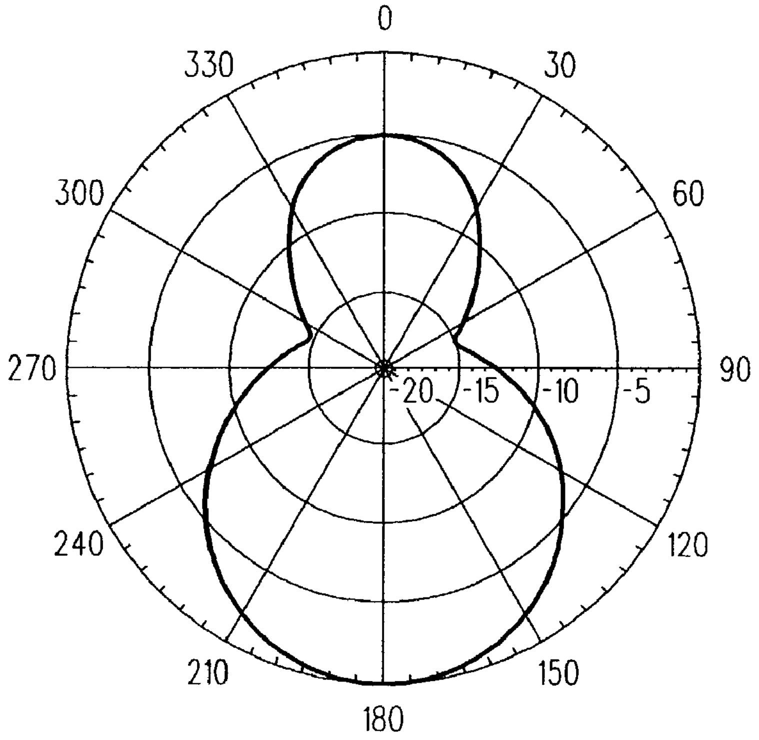
FIGS. 8A and 8B respectively show simulation patterns in a horizontal plane and in a vertical plane that were obtained to indicate the performance of an exemplary array antenna configured like the array antenna shown in FIG. 4.
Figure 8B:
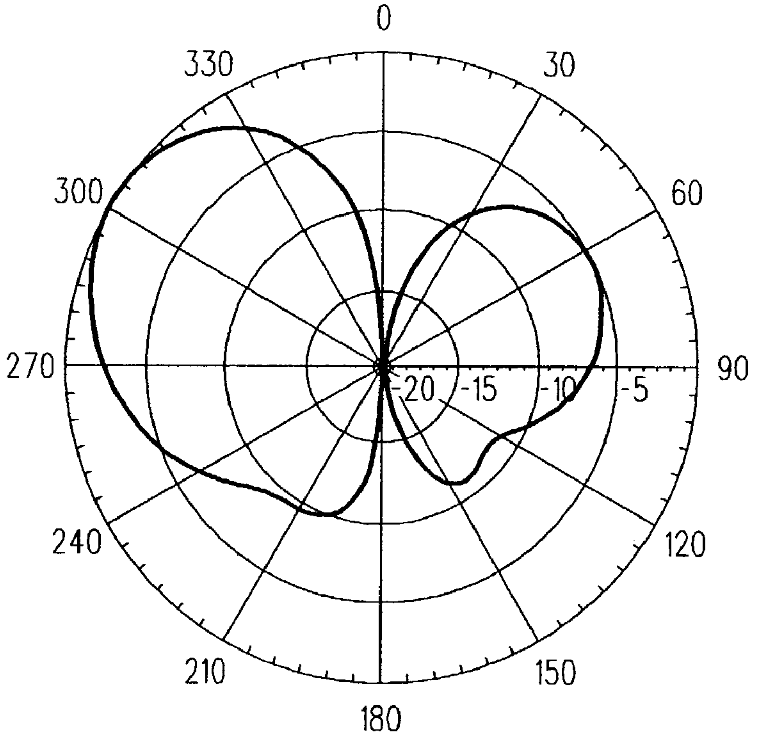

Referring to FIGS. 8A and 8B, there are respectively shown two simulation patterns one in a horizontal plane and the other in a vertical plane that where obtained to indicate the performance of an exemplary array antenna 302. The exemplary array antenna 302 has a configuration similar to the array antenna 302*a* shown in FIG. 4 where each parasitic antenna element 404 is arranged on a circumference of a predetermined circle around the radiating antenna element 402. In this simulation, the radiating antenna element 402 and the parasitic antenna elements 404 were separated from one another by $0.25\lambda_0$.

Referring again to FIG. 4, the antenna array 302*a* operates by exciting the radiating antenna element 402 with the radio frequency energy of a radio signal. Thereafter, the radio frequency energy of the radio signal emitted from the radiating antenna element 402 is received by the parasitic antenna elements 404 which then re-radiate the radio frequency energy after it has been reflected and phase changed by the voltage-tunable capacitors 406. The controller 408 changes the phase of the radio frequency energy at each parasitic antenna element 404 by applying a predetermined DC voltage to each voltage-tunable capacitor 406 which changes the capacitance of each voltage-tunable capacitor 406. This mutual coupling between the radiating antenna element 402 and the parasitic antenna elements 404 enables one to steer the radiation beams and nulls of the radio signal that is emitted from the antenna array 302*a*.

Figure 9:
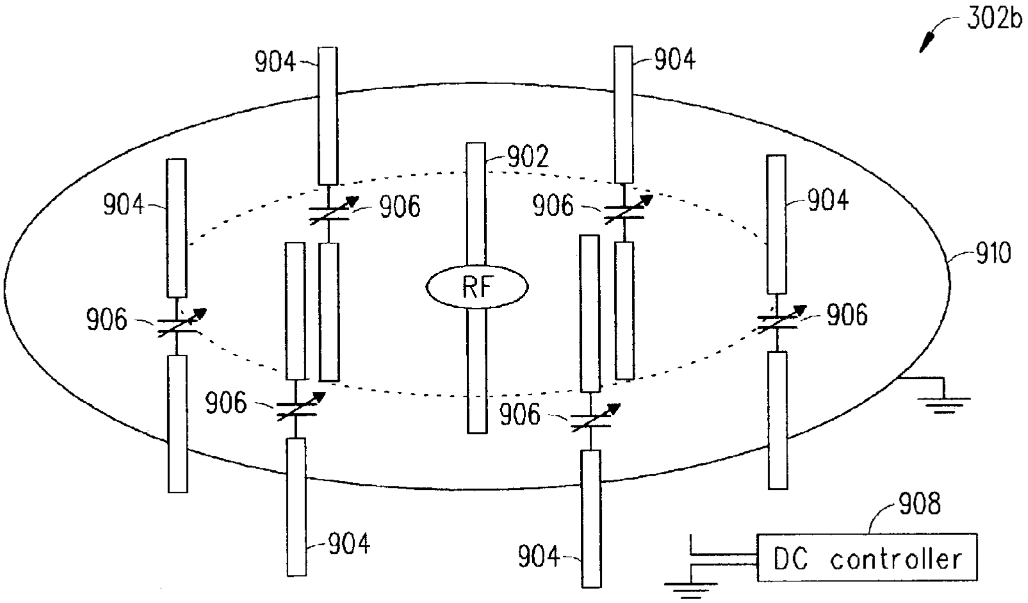
FIG. 9 is a perspective view that illustrates the basic components of a second embodiment of the array antenna shown in FIG. 3.

Referring to FIG. 9, there is a perspective view that illustrates the basic components of a second embodiment of the array antenna 302*b*. The array antenna 302*b* has a similar structure and functionality to array antenna 302*a* except that the antenna elements 902 and 904 are configured as dipole elements instead of a monopole elements as shown in FIG. 4. The array antenna 302*b* includes a radiating antenna element 902 capable of transmitting and receiving radio signals and one or more parasitic antenna elements 904 that are incapable of transmitting or receiving radio signals. Each parasitic antenna element 904 (six shown) is located a predetermined distance away from the radiating antenna element 902. A voltage-tunable capacitor 906 (six shown) is connected to each parasitic element 904. A controller 908 is used to apply a predetermined DC voltage to each one of the voltage-tunable capacitors 906 in order to change the capacitance of each voltage-tunable capacitor 906 and thus enable one to control the directions of the maximum radiation beams and the minimum radiation beams (nulls) of a radio signal emitted from the array antenna 302*b*. The controller 908 may be part of or interface with the network controller 314 (see FIG. 3).

In the particular embodiment shown in FIG. 9, the array antenna 302*b* includes one radiating antenna element 902 and six parasitic antenna elements 904 all of which are configured as dipole elements. The antenna elements 902 and 904 are electrically insulated from a grounding plate 910. The grounding plate 910 has an area large enough to accommodate all of the antenna elements 902 and 904. In the preferred embodiment, each parasitic antenna element 904 is located on a circumference of a predetermined circle around the radiating antenna element 902. For example, the radiating antenna element 902 and the parasitic antenna elements 904 can be separated from one another by about $0.2\lambda_0$–$0.5\lambda_0$ where $\lambda_0$ is the working free space wavelength of the radio signal.

Figure 10:
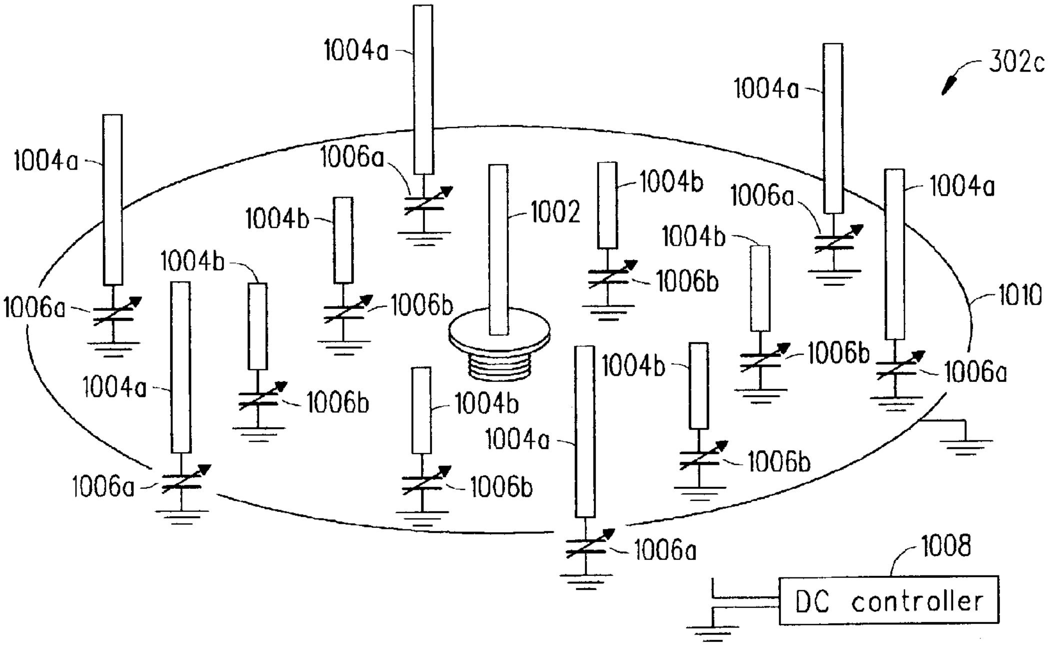
FIG. 10 is a perspective view that illustrates the basic components of a third embodiment of the array antenna shown in FIG. 3.

Referring to FIG. 10, there is a perspective view that illustrates the basic components of a third embodiment of the array antenna 302*c*. The array antenna 302*c* includes a radiating antenna element 1002 capable of transmitting and receiving dual band radio signals. The array antenna 302*c* also includes one or more low frequency parasitic antenna elements 1004*a* (six shown) and one or more high frequency parasitic antenna elements 1004*b* (six shown). The parasitic antenna elements 1004*a* and 1004*b* are incapable of transmitting or receiving radio signals. Each of the parasitic antenna elements 1004*a* and 1004*b* are locate a predetermined distance away from the radiating antenna element 1002. As shown, the low frequency parasitic antenna elements 1004*a* are located on a circumference of a "large" circle around both the radiating antenna element 1002 and the high frequency parasitic antenna elements 1004*b*. And, the high frequency parasitic antenna elements 1004*b* are located on a circumference of a "small" circle around the radiating antenna element 1002. In this embodiment, the low frequency parasitic antenna elements 1004*a* are the same height as the radiating antenna element 1002. And, the high frequency parasitic antenna elements 1004*b* are shorter than the low frequency parasitic antenna elements 1004*a* and the radiating antenna element 1002.

The array antenna 302*c* also includes one or more low frequency voltage-tunable capacitors 1006*a* (six shown) which are connected to each of the low frequency parasitic elements 1004*a*. In addition, the array antenna 302*c* includes one or more high frequency voltage-tunable capacitors 1006*b* (six shown) which are connected to each of the high frequency parasitic elements 1004*b*. A controller 1008 is used to apply a predetermined DC voltage to each one of the voltage-tunable capacitors 1006*a* and 1006*b* in order to change the capacitance of each voltage-tunable capacitor 1006*a* and 1006*b* and thus enable one to control the directions of the maximum radiation beams and the minimum radiation beams (nulls) of a dual band radio signal that is emitted from the array antenna 302*c*. The controller 1008 may be part of or interface with the network controller 314 (see FIG. 3).

In the particular embodiment shown in FIG. 10, the array antenna 302*c* includes one radiating antenna element 1002 and twelve parasitic antenna elements 1004*a* and 1004*b* all of which are configured as monopole elements. The antenna elements 1002, 1004*a* and 1004*b* are electrically insulated from a grounding plate 1010. The grounding plate 1010 has an area large enough to accommodate all of the antenna elements 1002, 1004*a* and 1004*b*. It should be understood that the low frequency parasitic antenna elements 1004*a* do not affect the high frequency parasitic antenna elements 1004*b* and vice versa.

The antenna array 302*c* operates by exciting the radiating antenna element 1002 with the high and low radio frequency energy of a dual band radio signal. Thereafter, the low frequency radio energy of the dual band radio signal emitted from the radiating antenna element 1002 is received by the low frequency parasitic antenna elements 1004*a* which then re-radiate the low frequency radio frequency energy after it has been reflected and phase changed by the low frequency voltage-tunable capacitors 1006*a*. Likewise, the high frequency radio energy of the dual band radio signal emitted from the radiating antenna element 1002 is received by the high frequency parasitic antenna elements 1004*b* which then re-radiate the high frequency radio frequency energy after it has been reflected and phase changed by the high frequency voltage-tunable capacitors 1006*b*. The controller 1008 changes the phase of the radio frequency energy at each parasitic antenna element 1004*a* and 1004*b* by applying a predetermined DC voltage to each voltage-tunable capacitor 1006*a* and 1006*b* which changes the capacitance of each voltage-tunable capacitor 1006*a* and 1006*b*. This mutual coupling between the radiating antenna element 1002 and the parasitic antenna elements 1004*a* and 1004*b* enables one to steer the radiation beams and nulls of the dual band radio signal that is emitted from the antenna array 302*c*. The array antenna 302*c* configured as described above can be called a dual band, endfire, phased array antenna 302*c*.

Although the array antennas described above have radiating antenna elements and parasitic antenna elements that are configured as either a monopole element or dipole element, it should be understood that these antenna elements can have different configurations. For instance, these antenna elements can be a planar microstrip antenna, a patch antenna, a ring antenna or a helix antenna.

In the above description, it should be understood that the features of the array antennas apply whether it is used for transmitting or receiving. For a passive array antenna the properties are the same for both the receive and transmit modes. Therefore, no confusion should result from a description that is made in terms of one or the other mode of operation and it is well understood by those skilled in the art that the invention is not limited to one or the other mode.

Following are some of the different advantages and features of the array antenna 302 of the present invention:

- The array antenna 302 has a simple configuration.
- The array antenna 302 is relatively inexpensive.
- The array antenna 302 has a high RF power handling parameter of up to 20 W. In contrast, the traditional array antenna 200 has a RF power handling parameter that is less than 1 W.
- The array antenna 302 has a low linearity distortion represented by IP3 of upto +65 dBm. In contrast, the traditional array antenna 200 has a linearity distortion represented by IP3 of about +30 dBm.
- The array antenna 302 has a low voltage-tunable capacitor loss.
- The dual band array antenna 302*c* has two bands each of which works upto 20% of frequency. In particular, there are two center frequency points for the dual band antenna f0 each of which has a bandwidth of about 10%~20% [(f1+f2)/2=f0, Bandwidth=(f2−f1)/f0*100%] where f1 and f2 are the start and end frequency points for one frequency band. Whereas the single band antenna 302*a* and 302*b* works in the f1 to f2 frequency range. The dual band antenna 302*c* works in one f1 to f2 frequency range and another f1 to f2 frequency range. The two center frequency points are apart from each other, such as more than 10%. For example, 1.6 GHz~1.7 GHz and 2.4 GHz~2.5 GHz, etc. The traditional array antenna 200 cannot support a dual band radio signal.

While the present invention has been described in terms of its preferred embodiments, it will be apparent to those skilled in the art that various changes can be made to the disclosed embodiments without departing from the scope of the invention as set forth in the following claims.

What is claimed is:

1. An array antenna comprising:

a radiating antenna element;

at least one parasitic antenna element;

at least one voltage-tunable dielectric capacitor connected to said at least one parasitic antenna element; and a controller for applying a voltage to each voltage-tunable capacitor to change the capacitance of each voltage-tunable capacitor and thus control the directions of maximum radiation beams and minimum radiation beams of a radio signal emitted from said radiating antenna element and said at least one parasitic antenna element, and wherein said array antenna is capable of low linearity distortion with an IP3 of up to +65 dBm.

2. The array antenna of claim 1, wherein each voltage-tunable capacitor includes a tunable ferroelectric layer and a pair of metal electrodes separated by a predetermined distance and located on top of the ferroelectric layer.

3. The array antenna of claim 1, wherein each parasitic antenna element is arranged a predetermined distance from said radiating antenna element.

4. The array antenna of claim 1, wherein said radiating antenna element and said at least one parasitic antenna element are separated from one another by about 0.2?–0.5X0 where No is a working free space wavelength of the radio signal.

5. The array antenna of claim 1, wherein said radiating antenna element and said at least one parasitic antenna element each have one of the following configurations:

a monopole antenna;

a dipole antenna;

a planar microstrip antenna; a patch antenna;

a ring antenna; or a helix antenna.

6. The array antenna of claim 1, wherein said minimum radiation beams are nulls and said maximum radiation beams are 360 degree steerable radiation beams.

7. The array antenna of claim 1, wherein:

said radiating antenna element is a dual band radiating antenna element; and said at least one parasitic antenna element includes at least one low frequency parasitic antenna element and at least one high frequency parasitic antenna.

8. An array antenna comprising:

a radiating antenna element excited by radio frequency energy of a radio signal; at least one parasitic antenna element;

at least one voltage-tunable dielectric capacitor connected to said at least one parasitic antenna element;

each parasitic antenna element receives the radio frequency energy of the radio signal emitted from said radiating antenna element and then re-radiates the radio frequency energy of the radio signal after the radio frequency energy has been reflected and phase changed by each voltage-tunable capacitor; and a controller that phase changes the radio frequency energy at each parasitic antenna element by applying a voltage to each voltage-tunable capacitor to change the capacitance of each voltage-tunable capacitor and thus enables the steering of the radiation beams and nulls of the radio signal emitted from said radiating antenna element and said at least one parasitic antenna element, and wherein said array antenna is capable of low linearity distortion with an IP3 of up to +65 dBm.

9. The array antenna of claim 8, wherein each voltage-tunable capacitor includes a tunable ferroelectric layer and a pair of metal electrodes separated by a predetermined distance and located on top of the ferroelectric layer.

10. The array antenna of claim 8, wherein said at least one parasitic antenna element is arranged on a circumference of a predetermined circle around said radiating antenna element.

11. The array antenna of claim 8, wherein said radiating antenna element and said at least one parasitic antenna element are separated from one another by about 0.22\0–0.5 No where )b is a working free space wavelength of the radio signal.

12. The array antenna of claim 8, wherein said radiating antenna element and said at least one parasitic antenna element each have one of the following configurations:

a monopole antenna;

a dipole antenna;

a planar microstrip antenna;

a patch antenna;

a ring antenna; or a helix antenna.

13. The array antenna of claim 8, wherein:

said radiating antenna element is a dual band radiating antenna element; and said at least one parasitic antenna element includes at least one low frequency parasitic antenna element and at least one high frequency parasitic antenna.

14. A wireless communication network comprising:

a hub node having at least one dynamically directionally controllable communications link; and a network controller for dynamically controlling the direction of the communications link to enable transmission of radio signals between said hub node and a plurality of remote nodes, wherein said hub node includes an array antenna comprising:

a radiating antenna element;

at least one parasitic antenna element; and at least one voltage-tunable dielectric capacitor connected to said at least one parasitic antenna element, wherein said network controller applies a voltage to each voltage-tunable capacitor to change the capacitance of each voltage-tunable capacitor and thus control the directions of maximum radiation beams and minimum radiation beams of the radio signals emitted from said hub node to said remote users, and wherein said array antenna is capable of low linearity distortion with an IP3 of upto +65 dBm.

15. The wireless communication network of claim 14, wherein each voltage-tunable capacitor includes a tunable ferroelectric layer and a pair of metal electrodes separated by a predetermined distance and located on top of the ferroelectric layer.

16. The wireless communication network of claim 14, wherein said at least one parasitic antenna element is arranged on a circumference of a predetermined circle around said radiating antenna element.

17. The wireless communication network of claim 14, wherein said radiating antenna element and said at least one parasitic antenna element are separated from one another by about 0.2T0–0.5? where ?b is a working free space wavelength of the radio signal.

18. The wireless communication network of claim 14, wherein said radiating antenna element and said at least one parasitic antenna element each have one of the following configurations:

a monopole antenna;

a dipole antenna;
a planar microstrip antenna;
a patch antenna;
a ring antenna; or
a helix antenna.

19. The wireless communication network of claim 14, wherein: said radiating antenna element is a dual band radiating antenna element; and said at least one parasitic antenna element includes at least one low frequency parasitic antenna element and at least one high frequency parasitic antenna.

20. The wireless communication network of claim 14, wherein said remote nodes include mobile phones, laptop computers or personal digital assistants.

21. A method for transmitting communications signals comprising the steps of:

providing a hub node having at least one dynamically directionally controllable communications link;

providing a network controller for dynamically controlling the direction of the communications link to enable transmission of radio signals between said hub node and a plurality of remote nodes, wherein said hub node includes an array antenna comprising:

a radiating antenna element;

at least one parasitic antenna element; and at least one voltage-tunable dielectric capacitor connected to said at least one parasitic antenna element, wherein said network controller applies a voltage to each voltage-tunable capacitor to change the capacitance of each voltage-tunable capacitor and thus control the directions of maximum radiation beams and minimum radiation beams of the radio signals emitted from said hub node to said remote users, and wherein said array antenna is capable of low linearity distortion with an IP3 of upto +65 dBm.

22. The method of claim 21, wherein each voltage-tunable capacitor includes a tunable ferroelectric layer and a pair of metal electrodes separated by a predetermined distance and located on top of the ferroelectric layer.

23. The method of claim 21, wherein said at least one parasitic antenna element is arranged on a circumference of a predetermined circle around said radiating antenna element.

24. The method of claim 21, wherein said radiating antenna element and said at least one parasitic antenna element are separated from one another by about 0.2?–0.5X0 where X0 is a working free space wavelength of the radio signal.

25. The method of claim 21, wherein said radiating antenna element and said at least one parasitic antenna element each have one of the following configurations:

a monopole antenna;
a dipole antenna;
a planar microstrip antenna;
a patch antenna;
a ring antenna; or
a helix antenna.

26. The method of claim 21, wherein: said radiating antenna element is a dual band radiating antenna element; and said at least one parasitic antenna element includes at least one low frequency parasitic antenna element and at least one high frequency parasitic antenna.

27. The method of claim 21, wherein said remote nodes include mobile phones, laptop computers or personal digital assistants.

* * * * *